3,248,407
PROCESS FOR PRODUCTION OF Δ$^{1,3,5(10)}$ STEROIDS
Francisco Alvarez, Mexico City, Mexico, assignor to Syntex Corporation, Panama, Panama, a corporation of Panama
No Drawing. Filed July 13, 1964, Ser. No. 382,360
23 Claims. (Cl. 260—397.4)

This invention relates to novel cyclopentanopolyhydrophenanthrene derivatives, to processes for their preparation, and to processes for the conversion of said derivatives into other valuable cyclopentanopolyhydrophenanthrene derivatives.

More particularly, this invention relates, first of all, to novel 10β-lower acyloxy-19-nor-Δ$^4$-3,20-diketopregnenes represented by the general formula:

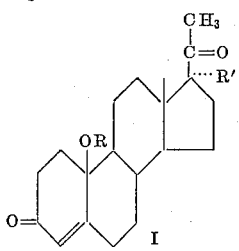

wherein R represents a lower acyl group containing from 2 to 7 carbon atoms, inclusive, and $R^1$ represents hydrogen, a hydroxyl group or an acyloxy group containing less than 12 carbon atoms.

This invention also relates to processes for the conversion of these 10β-lower acyloxy-19-nor-Δ$^4$-3,20-diketopregnenes, as well as related compounds, e.g., 10β-lower acyloxy-Δ$^4$-3-ketoandrostenes represented by the general formula:

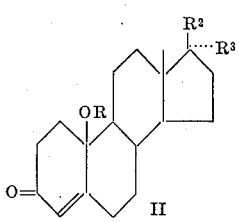

wherein R has the same meaning as set forth hereinabove for Formula I; $R^2$ represents a hydroxyl group or an acyloxy group containing less than 12 carbon atoms; $R^3$ represents hydrogen, a lower alkyl group, such as methyl, ethyl, propyl, butyl, hexyl, and the like, a lower alkenyl group, such as vinyl, allyl, and the like, or a lower alkynyl group, such as ethynyl, propynyl, hexynyl, and the like, and $R^2$ and $R^3$ taken together can also represent a keto group, into the corresponding Δ$^{1,3,5(10)}$-3-hydroxy steroids or 3-esters and 3-lower alkyl ethers thereof, which processes can be illustrated schematically as follows, using, for the sake of simplicity, only the A and B rings of the steroid nucleus:

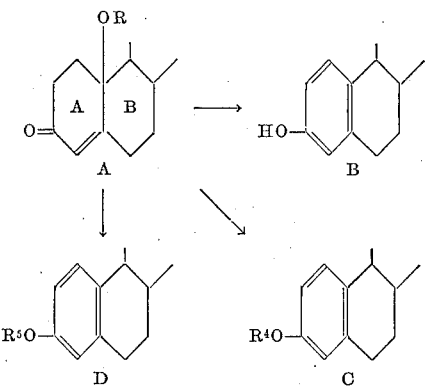

In these partial formulas R has the same meaning as set forth hereinabove for Formula I, $R^4$ represents a lower alkyl group and $R^5$ represents an acyl group containing less than 12 carbon atoms.

The acyloxy and acyl groups represented by $R^1$, $R^2$ and $R^5$ in Formulas I, II and D hereinabove are preferably derived from hydrocarbon carboxylic acids containing less than 12 carbon atoms, which can be saturated or unsaturated, of straight, branched, cyclic or cyclic-aliphatic chain, or aromatic, and can either be unsubstituted or substituted with functional groups such as hydroxyl groups, alkoxy groups containing up to 5 carbon atoms, acyloxy groups containing up to 12 carbon atoms, nitro groups, amino groups or halogen atoms. Included among such acyloxy and acyl groups are those derived from acetic, t-butylacetic, trimethylacetic, phenoxyacetic, aminoacetic, propionic, cyclopentylpropionic, β-chloropropionic, butyric, enanthic, benzoic and succinic acids and the like.

The acyl groups represented by R in Formulas I and A hereinabove are also preferably derived from hydrocarbon carboxylic acids of the type just described, but in this case from ones containing from 2 to 7 carbon atoms, inclusive, e.g., acyl groups derived from acids such as acetic, propionic, butyric, benzoic, and the like.

Besides the keto group shown in the 3-position in partial formula A hereinabove, and the conventional substituents found in the 17-position in androstane derivatives, e.g., the 17-substituents represented by $R^2$ and $R^3$ in Formula II hereinabove, a ketalized 17-keto group, and the like, and in the 17-, 20-, 21-, and sometimes, the 16-position in pregnane derivatives, e.g., the 17β-acetyl side chain, with or without a 17α-hydroxyl or acyloxy group, as shown in Formula I hereinabove, a 17β-acetyl side chain having a ketalized 20-keto group, a dihydroxyacetone side chain wherein the hydroxyl groups are either free or functionally converted, e.g., one wherein the hydroxyl groups have been esterified or wherein the entire side-chain has been converted to a bismethylenedioxy derivative, a 16-hydroxyl group, and the like, the starting materials A employed in the novel process of the present invention can also contain other non-interfering substituents. Included among such substituents are keto groups or derivatives thereof, such as enol ether or ketol derivatives, hydroxyl groups or derivatives thereof, such as ether, ester, acetal or ketal derivatives, alkyl groups, such as methyl, ethyl or propyl groups, halogen atoms, such as fluorine or chlorine, or the like, which, depending on the particular substituent, can be present at one or more of positions 1, 2, 4, 6, 7, 8, 9, 11, 12, 14, 15, 16, 18, 20 and 21 on the steroid nucleus.

In carrying out each of the above-illustrated processes (A–B, A–C and A–D), the starting material A is treated with either a proton donor other than water or a strong base at a temperature ranging from room temperature (about 25° C.) or lower to about 100° C., and preferably at a temperature of from about 40° C. to about 60° C., for from about 5 hours or less to about 48 hours or longer. Parenthetically, it should be noted here that if higher or lower reaction temperatures coupled with shorter or longer reaction times are employed, only the rate of the reaction will be affected. Thus, the reaction conditions given hereinabove are not critical, but merely represent the best mode of carrying out the invention known at the present time.

Preferred proton donors include weak and strong organic acids, such as acetic acid, oxalic acid, trichloroacetic acid, methanesulfonic acid, benzenesulfonic acid, p-toluenesulfonic acid, and the like, and mineral acids, such as hydrochloric acid, sulfuric acid, nitric acid, perchloric acid, boric acid, phosphorous acid, phosphoric acid, and the like.

The strong bases which can be used include inorganic bases which, in aqueous 1 N solution, have a pH of 8 or above as measured at 25° C., such as sodium hydroxide, potassium hydroxide, trisodium phosphate, ammonium hydroxide, ferrous hydroxide, sodium carbonate, potassium cyanide, and the like.

The proton donor will generally be used in trace amounts, e.g., one or two drops of the proton donor or a solution thereof, such as an aqueous 70% perchloric acid solution, since only a catalytic amount sufficient to enolize the 3-keto group in the steroid starting material is required.

When the reaction is carried out in the presence of a strong base, at least about 1 molar equivalent of the base, e.g., an amount ranging from about 1.1 to about 5 molar equivalents or more, per molar equivalent of the steroid starting material, will be used.

Furthermore, larger quantities of both the proton donor or the strong base can also be employed and, up to a point, the use of larger amounts of these materials will accelerate the reaction rate. In addition, in certain cases the proton donor or strong base, or solutions thereof, can be the sole solvent for the reaction.

If the starting steroid A is contacted with the proton donor or strong base alone, or in water or an inert organic solvent, e.g., a monoether such as diethyl ether, diisopropyl ether, tetrahydrofuran or the like, a diether such as dioxane or the like, a ketone such as acetone, methyl ethyl ketone, diethyl ketone, methylisobutylketone, or the like, or dimethylsulfoxide, a di(lower)alkylamide such as dimethylformamide, dimethylacetamide, or the like, a halogenated hydrocarbon such as methylene chloride, ethylene dichloride, or the like, as well as mixtures thereof, the reaction will proceed in the direction A–B, i.e., a $\Delta^{1,3,5(10)}$-3-hydroxy steroid B will be produced and, where a proton donor is employed as the catalyst, acid-sensitive groupings in the molecule, such as enol ether, tetrahydropyranyl ether and ketal groups, and the like, will be hydrolyzed. For example, a 17- or 20-ketal group will be hydrolyzed to the corresponding free keto group. Similarly, where a strong base is employed as the catalyst, groups sensitive to basic hydrolysis, e.g., ester groups, can be hydrolyzed. For example, a 17β- or 21-acyloxy group will be hydrolyzed to the corresponding free hydroxyl group.

The starting steroid can also be contacted with the catalyst in the presence of a lower alkanol, such as methanol, ethanol, propanol, n-amylol, or the like, or a substance which, in acid medium, provides a lower alkanol, e.g., a lower alkyl orthoformate such as methyl or ethyl orthoformate, or the like, or a lower alkane containing at least three carbon atoms which is substituted on a nonterminal carbon atom thereof with two lower alkoxy groups, e.g., 2,2-dimethoxypropane, 2,2-dimethoxybutane, 3,3-diethoxypentane, or the like, or a mixture of a lower alkanol and a substance which in acid medium provides a lower alkanol. One or more inert organic solvents or diluents, e.g., those mentioned hereinabove, can also be present.

In this case if the reaction is carried out in the presence of a proton donor, it will proceed in the direction A–C, i.e., a $\Delta^{1,3,5(10)}$-3-lower alkoxy steroid C, wherein the lower alkoxy group corresponds to that of the lower alkanol present, will be obtained, and while acid-sensitive groupings in the molecule will be hydrolyzed, just as in the case where no lower alkanol is present, other etherifiable groups in the molecule can be etherified at the same time, depending on the alkanol present and its source. For example, when $\Delta^4$-estren-10β-ol-3,17-dione 10-acetate is heated with ethyl orthoformate in the presence of a catalytic amount of sulfuric acid preferably under substantially anhydrous conditions, the 17-diethyl ketal of estrone 3-ethyl ether is produced. However, if this reaction is carried out in the presence of 2,2-dimethoxypropane, or methanol or ethanol themselves, rather than ethyl orthoformate, the 3-methyl or 3-ethyl ether of estrone, unetherified at the 17-position, is obtained.

If the starting steriod is contacted with a strong base in the presence of a lower alkanol or a substance which, in acid medium, provides a lower alkanol, the reaction will proceed in the direction A–B, i.e., no concomitant etherification will take place, although groupings in the steroid molecule which are hydrolyzable under basic conditions will be hydrolyzed. Thus, in this case, the lower alkanol or lower alkanol-producing solvent will be an inert solvent.

Ordinarily, the lower alkanol will be used in amounts ranging from about 1 to about 10 times, and preferably from about 5 times to about 7 times, the weight of the steroid starting material, or an amount of a substance which, in acid medium, provides a lower alkanol, sufficient to give the required amount of lower alkanol, will be employed.

Finally, the starting steroid can also be reacted in the presence of either an anhydride of an organic carboxylic acid containing less than 12 carbon atoms, and preferably an anhydride of a hydrocarbon carboxylic acid of the type referred to hereinabove, such as acetic anhydride, propionic anhydride, butyric anhydride, succinic anhydride, and the like, or an enol ester of an organic carboxylic acid containing less than 12 carbon atoms with a lower alkanone, said enol ester having the general formula:

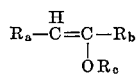

wherein $R_a$ and $R_b$ each represent hydrogen or a lower alkyl group, with at least one of $R_a$ and $R_b$ being lower alkyl, and $R_c$ represents an acyl group containing less than 12 carbon atoms, such as isopropenyl acetate, isopropenyl propionate, isopropenyl butyrate, isobutenyl acetate, and the like. One or more inert organic solvents or diluents, e.g., those mentioned hereinabove, can also be present.

In this case, the reaction will be carried out in the presence of a proton donor, rather than a strong base and proceeds in the direction A–D, i.e., a $\Delta^{1,3,5(10)}$-3-acyloxy steroid D, wherein the acyloxy group corresponds to that of the anhydride or enol ester present will be produced, and while acid-sensitive groupings in the molecule will also be hydrolyzed in this case, other esterifiable groups in the molecule, such as primary or secondary hydroxyl groups, enolizable keto groups, e.g., at the 17-position, and the like, can be esterified.

Ordinarily, the anhydride will be used in amounts ranging from about 1 to about 10 molar equivalents, and preferably from about 2 to about 4 molar equivalents, per molar equivalent of steroid starting material, while the enol acylate will usually be employed in amounts ranging from about 1 to about 10 molar equivalents, and preferably from about 5 to about 8 molar equivalents, per molar equivalent of steroid starting material.

In addition to being valuable starting materials for the above-described processes, the novel 10β-lower acyloxy-19-nor-$\Delta^4$-3,20-diketopregnenes of the present invention also have useful pharmacological properties, i.e., they are progestational agents having anti-estrogenic, anti-androgenic, anti-gonadotrophic and diuretic properties. They are also useful in fertility control, in the treatment of premenstrual tension, and in lowering blood cholesterol levels.

The 10β-lower acyloxy-$\Delta^4$-3-keto steroid starting materials A used in the above-described processes can be obtained from the corresponding 19 - hydroxy - $\Delta^4$ - 3 - keto steroids, which are themselves obtained as described in copending U.S. patent application Serial No. 201,802, filed June 12, 1962, now U.S. Patent No. 3,145,202, by a method which can be illustrated schematically as follows, again using, for the sake of simplicity, only the A and B rings of the steroid nucleus:

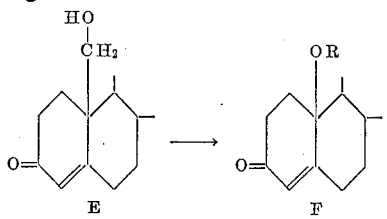

In these partial formulas R has the same meaning as set forth hereinabove for Formula I.

In carrying out this method, the 19-hydroxy-Δ⁴-3-keto starting steroids E, dissolved in an inert organic solvent, such as benzene, toluene, xylene, carbon tetrachloride, or the like, is reacted with from about 1 to about 2 molar equivalents, and preferably with from about 1.05 to about 1.1 molar equivalents, per molar equivalent of steroid, of a lead tetraacetate wherein the acyl radical is a lower acyl radical containing from 2 to 7 carbon atoms, inclusive, e.g., lead tetraacetate, lead tetrapropionate, lead tetrabutyrate, lead tetrabenzoate, or the like, to produce the corresponding 10β-lower acyloxy-Δ⁴-3-keto steroid. The lead tetraacylate can be used either alone or together with a buffering amount of an alkali metal carbonate or an alkaline earth metal carbonate, such as sodium carbonate, calcium carbonate, and the like, and the reaction will be carried out at a temperature of from about 50° C. to about 100° C., and preferably at from about 65° C. to about 75° C., for from about 10 minutes to about 1 hour or more.

An illustrative but by no means exhaustive listing of 19-hydroxy-Δ⁴-3-keto steroid starting materials which can be used to prepare the corresponding 10β-lower acyloxy-Δ⁴-3-ones includes:

Δ⁴-androsten-19-ol-3,17-dione,
Δ⁴-androstene-17β,19-diol-3-one,
17α-methyl-Δ⁴-androstene-17β,19-diol-3-one,
17α-ethyl-Δ⁴-androstene-17β,19-diol-3,one,
17α-vinyl-Δ⁴-androstene-17β,19-diol-3-one,
17α-ethynyl-Δ⁴-androstene-17β,19-diol-3-one,
17α-ethynyl-Δ⁴-androstene-17β,19-diol-3-one,
17α-ethynyl-Δ⁴-androstene-17β,19-diol-3-one-17-acetate,
Δ⁴-pregnen-19-ol-3,20-dione,
Δ⁴-pregnene-17α,19-diol-3,20-dione,
Δ⁴-pregnene-17α,19-diol-3,20-dione 17-acetate,
16α-methyl-Δ⁴-pregnen-19-ol-3,20-dione,
16β-methyl-Δ⁴-pregnen-19-ol-3,20-dione,
16α,17α-isopropylidenedioxy-Δ⁴-pregnen-19-ol-3,20-dione,
16α-methyl-Δ⁴-pregnene-17α,19-diol-3,20-dione-17-acetate,
17,20;20,21-bismethylenedioxy-Δ⁴-pregnen-19-ol-3-one,
17,20;20,21-bismethylenedioxy-Δ⁴-pregnen-19-ol-3,11-dione, and the like.

A 17α-lower alkyl, lower alkenyl or lower alkynyl substituent can also be introduced in known manner either after the aforementioned lead tetraacylate reaction (E–F) or after the ring A aromatization reaction (A–B, A–C or A–D). Thus, for example, the corresponding 17-keto compound can be reacted with a lower alkyl, lower alkenyl or lower alkynyl magnesium halide, e.g., methyl, vinyl or ethynyl magnesium bromide, in an inert organic solvent such as benzene or the like. The 17-keto steroid can also be reacted with acetylene or the like in the presence of potassium t-amylate and t-amyl alcohol, or with an alkoxyalkyne, e.g., ethoxyacetylene, in the presence of an alkyl magnesium halide, e.g., ethyl magnesium bromide, to give the corresponding 17α-alkynyl-17β-hydroxy or alkoxy derivatives directly. Where compounds having a 17α-lower alkenyl substituent are derived, the 17α-lower alkynyl group can be reduced to a 17α-lower alkenyl group, e.g., by dissolving the 17α-lower alkynyl steroid in an inert organic solvent such as pyridine, collidine, lutidine or the like, and hydrogenating at atmospheric pressure and room temperature with hydrogen gas, preferably in the presence of a hydrogenation catalyst such as pre-hydrogenated palladized calcium carbonate or platinum or palladium-on-charcoal, until approximately one molar equivalent of hydrogen has been absorbed. Similarly, compounds having a 17α-lower alkyl substituent containing two or more carbon atoms can be prepared by hydrogenating the corresponding 17α-lower alkynyl steroid at atmospheric pressure and room temperature in dioxane, tetrahydrofuran, or the like and in the presence of a hydrogenation catalyst, e.g., one of those referred to hereinabove, until two molar equivalents of hydrogen have been absorbed.

In order that those skilled in the art can more fully understand the present invention, the following examples are set forth. These examples are given solely for the purpose of illustrating the invention and should not be considered as expressing limitations unless so set forth in the appended claims.

PREPARATION A

A solution of 2 grams of sodium borohydride in 30 cc. of methanol was added, with stirring, to a solution of 2 grams of Δ⁴-androsten-19-ol-3,17-dione in 40 cc. of dimethylformamide, and the resulting reaction mixture was allowed to stand at room temperature overnight. Following this reaction period the reaction mixture was treated with acetic acid to decompose excess borohydride and then concentrated to a small volume under reduced pressure and diluted with water. The dilute solution was then extracted with ethyl acetate, and the extract was washed with water, dried over anhydrous sodium sulfate and evaporated to dryness. The resulting residue was crystallized from acetone-hexane to give Δ⁴-androstene-3β,17β,19-triol.

A mixture of 1 grams of the thus-prepared triol, 1.1 molar equivalents of 2,3-dichloro-5,6-dicyano-1,4-benzoquinone and 20 cc. of dioxane was held at room temperature for 3 hours. Following this reaction period the reaction mixture was filtered to remove the 2,3-dichloro-5,6-dicyano - 1,4-benzohydroquinone formed during the reaction, and the filtrate was then evaporated to dryness. The resulting residue was dissolved in acetone and passed through a column of alumina. Finally, crystallization from acetone/hexane gave Δ⁴-androstene-17β,19-diol-3-one.

PREPARATION B

A solution of 3 grams of 17α-ethynyl-Δ⁴-androstene-17β,19-diol-3-one in 125 cc. of dioxane was hydrogenated, at atmospheric pressure and room temperature in the presence of 0.5 gram of pre-hydrogenated palladium-on-charcoal catalyst, until two molar equivalents of hydrogen had been absorbed. At this point, the reaction was stopped and the catalyst was separated by filtration through Celite and washed with dioxane. The washings were then combined with the filtrate and the combined solution evaporated to dryness under vacuum. Recrystallization of the residue from acetone gave 17α-ethyl-Δ⁴-androstene-17β,19-diol-3-one.

PREPARATION C

A solution of 0.17 gram of potassium hydroxide in 0.2 cc. of water and 2.5 cc. of methanol was added over a 30 minute period to a boiling solution of 1 gram of Δ⁴-pregnene-17α,19-diol-3,20-dione 17-acetate in 30 cc. of methanol, contained under a nitrogen atmosphere. Following this addition, the reaction mixture was boiled for 2 hours more and then cooled to room temperature, neutralized with acetic acid, and concentrated to a small volume under reduced pressure. Next, water was added to the concentrated solution, and the resulting precipitate was collected by filtration and then crystallized from acetone/hexane, thus giving Δ⁴-pregnene-17α,19-diol-3,20-dione.

Example I

To a solution of 20 grams of Δ⁴-androsten-19-ol-3,17-dione in 200 ml. of anhydrous benzene there were added 40 grams of dry lead tetraacetate, and the resulting reaction mixture was refluxed under substantially anhydrous conditions for 2.5 hours. Following this reaction period the reaction mixture was cooled to room temperature and the lead diacetate formed during the reaction was collected by filtration and washed with 500 ml. of benzene. These washings were then combined with the filtrate and washed in a separatory funnel with water, then dried over anhydrous sodium sulfate and concentrated to dryness under vacuum. Chromatography of the resulting crystalline residue on silica gel gave a 75% yield (16.4 grams) of Δ⁴-estren-10β-ol-3,17-dione 10-acetate in the fractions eluted with 94% methylene chloride-6% diethyl ether, melting point 186–188° C.; [α]$_D$+90;

$\lambda_{max}^{EtOH}$ 242-3 mμ (ε, 15,520); $\nu_{max}^{KBr}$ 1740, 1670, 1630 and 1220 cm.⁻¹.

By repeating this procedure in every detail but one, namely, replacing Δ⁴-and rosten-19-ol-3,17-dione as the steroid starting material with Δ⁴-androstene-17β,19-diol-3-one, 17α-methyl-Δ⁴-androstene-17β,19-diol-3-one, 17α-ethyl-Δ⁴-androstene - 17β,19-diol-3-one, 17α-vinyl-Δ⁴-androstene-17β,19-diol-3-one and 17α-ethynyl-Δ⁴-androstene-17β,19-diol-3-one 17-acetate, respectively, the corresponding 10β-acetoxy steroids namely, Δ⁴-estrene-10β,17β-diol-3-one 10-acetate, 17α-methyl-Δ⁴-estrene-10β,17β-diol-3-one 10-acetate, 17α-ethyl-Δ⁴-estrene-10β,17β-diol-3-one 10-acetate, 17α-vinyl-Δ⁴-estrene-10β,17β-diol-3-one 10-acetate and 17α-ethynyl-Δ⁴-estrene-10β,17β-diol-3-one 10,17-diacetate, respectively, were obtained.

Example II

To a solution of 5 grams of Δ⁴-pregnen-19-ol-3,20-dione in 50 ml. of anhydrous benzene there were added 10 grams of dry lead tetraacetate, and the resulting reaction mixture was refluxed under substantially anhydrous conditions for 2.5 hours. Following this reaction period the reaction mixture was cooled to room temperature and the lead diacetate formed during the reaction was collected by filtration and washed with 150 ml. of benzene. These washings were then combined with the filtrate and concentrated to dryness under reduced pressure. Chromatography of the resulting crystalline residue on silica gel gave a 78% yield (4.22 grams) of impure 19-nor-Δ⁴-pregnen-10β-ol-3,20-dione 10-acetate in the fractions eluted with 96% methylene dichloride -4% diethyl ether, melting point 153–155° C. (acetone/hexone). Three recrystallizations from acetone/hexane gave the pure product, melting point 167–168° C.; [α]$_D$ +90°;

$\lambda_{max}^{EtOH}$ 242-4 mμ (ε, 15,100); $\nu_{max}^{KBr}$ 1740, 1700, 1670, 1630 and 1227 cm.⁻¹.

*Analysis.*—Calc'd. for $C_{22}H_{30}O_4$: C, 73.71; H, 8.44; O, 17.85. Found: C, 73.45; H, 8.34; O, 18.46.

By repeating this procedure in every detail but one, namely, replacing Δ⁴-pregnen-19-ol-3,20-dione as the steroid starting material with Δ⁴-pregnene-17α,19-diol-3,20-dione, Δ⁴-pregnene-17α,19-diol-3,20-dione 17-acetate, 16β - methyl-Δ⁴-pregnen-19-ol-3,20-dione, 16α,17α-isopropylidenedioxy-Δ⁴-pregnen-19-ol-3,20-dione, 16α - methyl-Δ⁴-pregnene-17α,19-diol-3,20-dione 17-acetate and 17,20;20,21-bismethylenedioxy-Δ⁴-pregnen-19-ol-3,11-dione, respectively, the corresponding 10β-acetoxy steroids, namely, 19-nor-Δ⁴-pregnene-10β,17α-diol-3,20-dione 10-acetate, 19-nor-Δ⁴-pregnene-10β,17-diol-3,20-dione 10,17-diacetate, 16β-methyl-19-nor-Δ⁴-pregnen-10β-ol-3,20-dione 10-acetate, 16α,17α-isopropylidenedioxy-19-nor-Δ⁴-pregnen-10β-ol-3,20-dione 10-acetate, 16α-methyl-19-nor-Δ⁴-pregnene-10β,17α-diol-3,20-dione 10,17-diacetate and 17,20;20,21 - bismethylenedioxy-19-nor-Δ⁴-pregnen-10β-ol-3,11-dione 10-acetate, respectively, were obtained.

Example III

A solution of 10 grams of Δ⁴-estren-10β-ol-3,17-dione 10-acetate in 100 ml. of acetone containing 1 gram of sulfuric acid was refluxed for 3 hours. Following this reaction period the reaction mixture was cooled to room temperature and diluted with ten times its volume of water. The resulting percipitate was collected by filtration, washed with water and dried. Crystallization from methanol gave estrone, melting point 250–253° C.;

$\lambda_{max}^{EtOH}$ 280 mμ (ε, 2,190).

This procedure was then repeated in every detail except for the following. First of all, Δ⁴-estren-10β-ol-3,17-dione 10-acetate was replaced by 17α-methyl-Δ⁴-estrene-10β,17β-diol-3-one 10 - acetate, 17α-vinyl-Δ⁴-estrene-10β,17β-diol-3-one 10-acetate, 19-nor-Δ⁴-pregnen-10β-ol-3,20-dione 10-acetate; 19-nor-Δ⁴-pregnene-10β,17α-diol-3,20-dione 10,17-diacetate, 16α,17α-isopropylidenedioxy-19-nor-Δ⁴-pregnen-10β-ol-3,20-dione 10-acetate and 17,20;20,21 - bismethylenedioxy-19-nor-Δ⁴-pregnen-10β-ol-3,11-dione 10-acetate, respectively.

Secondly, sulfuric acid was replaced by equivalent amounts of trichloroacetic acid, hydrochloric acid, p-toluenesulfonic acid, phosphoric acid, nitric acid and acetic acid, respectively, while acetone was replaced by diethyl ether, dioxane, dimethylformamide, methylene chloride, tetrahydrofuran and water, respectively.

In every case, the corresponding ring A aromatic steroid, i.e., 17α-methylestradiol, 17α-vinylestradiol 19-nor - Δ¹,³,⁵(¹⁰)-pregnatrien-3-ol-20-one. 19-nor-Δ¹,³,⁵(¹⁰)-pregnatriene - 3,17α-diol-20-one 17-acetate, 16α,17α-isopropylidenedioxy-19-nor-Δ¹,³,⁵(¹⁰) - pregnatrien-3-ol-20-one and 17,20;20,21 - bismethylenedioxy-19-nor-Δ⁴-pregnen-3-ol-11-one, respectively was obtained.

Example IV 5.67 grams of Δ⁴-estren-10β-ol-3,17-dione 10-acetate were dissolved in 100 ml. of methanol containing 2 grams of sodium hydroxide, and the resulting reaction mixture was allowed to stand at room temperature for 3 hours. Following this reaction period the reaction mixture was diluted with water, then neutralized with glacial acetic acid. The resulting bulky precipitate was collected by filtration, washed with water and dried. Crystallization from methanol gave estrone identical with that obtained in Example III hereinabove.

This procedure was then repeated in every detail except for the following. First of all, Δ⁴-estren-10β-ol-3,17-dione 10-acetate was replaced by Δ⁴-estrene-10β,17β-diol-3-one 10-acetate, 17α-ethyl-Δ⁴-estrene-10β,17β-diol-3-one 10-acetate, 17α-ethynyl-Δ⁴-estrene-10β,17β-diol-3-one 10,17-diacetate, 19-nor-Δ⁴-pregnene-10β,17α-diol-3,20-dione 10 - acetate, 16β-methyl-19-nor-Δ⁴-pregnen-10β-ol-3,20-dione 10-acetate and 16α-methyl-19-nor-Δ⁴-pregnene-10β,17α-diol-3,20-dione 10,17-diacetate.

Secondly, sodium hydroxide was replaced by equivalent amounts of potassium hydroxide, ferrous hydroxide, trisodium phosphate, potassium cyanide, ammonium hydroxide and sodium carbonate, respectively, while methanol was replaced by ethanol, propanol, dioxane, methylene chloride, acetone, water and methyl isobutyl ketone, respectively.

In every case, the corresponding ring A aromatic steroid, i.e., estradiol, 17α-ethylestradiol, 17α-ethynylestradiol, 19-nor-Δ¹,³,⁵,(¹⁰)-pregnatriene-3,17α-diol-20-one, 16β-methyl-19-nor-Δ¹,³,⁵(¹⁰)-pregnatrien-3-ol-20-one and 16α-methyl-19-nor-Δ¹,³,⁵(¹⁰)-pregnatriene-3,17α-diol-20-one 17-acetate, respectively, was obtained.

Example V

To a solution of 2 grams of Δ⁴-estren-10β-ol-3,17-dione 10-acetate in 20 ml. of methanol there was added 5 drops of an aqueous 70% perchloric acid solution, and the resulting reaction mixture was allowed to stand at room temperature overnight. Following this reaction period the reaction mixture was neutralized with aqueous potassium hydroxide and then diluted with water. The resulting precipitate was collected by filtration and then chromatographed on silica gel to give an 80% yield (1.38 grams) of estrone 3-methylether, melting point 161–162° C., homogeneous in thin layer chromatography and identical in all respects with an authentic specimen.

*Example VI*

To a solution of 10 grams of $\Delta^4$-estren-10$\beta$-ol-3,17-dione 10-acetate in 100 ml. of absolute ethanol there were added 2 ml. of an aqueous 70% perchloric acid solution, and the resulting reaction mixture was allowed to stand at room temperature for 48 hours. Following this reaction period the reaction mixture was diluted with water, and the oily product obtained was extracted with methylene dichloride. The extract was then washed with water until neutral, dried over anhydrous sodium sulfate and then concentrated to dryness under reduced pressure. The resulting residue was chromatographed on silica gel to give a 72% yield (6.5 grams) of estrone 3-ethyl ether in the fractions eluted with 94% methylene dichloride-6% diethyl ether, melting point 121° C.; $[\alpha]_D$ +146°;

$\lambda_{max.}^{EtoH}$ 278–280; 287 m$\mu$ ($\epsilon$, 2,140; 1,900)

*Analysis.*—calc'd. for $C_{20}H_{26}O_2$: C, 80.49; H, 8.78; O, 10.72. Found: C, 80.48; H, 8.69; O, 10.96.

*Example VII*

To a solution of 1 gram of $\Delta^4$-estren-10$\beta$-ol-3,17-dione 10-acetate in 20 ml. of n-amyl alcohol there were added 5 drops of an aqueous 70% perchloric acid solution, and the resulting reaction mixture was allowed to stand at room temperature for 36 hours. Following this reaction period the reaction mixture was diluted with water and extracted with methylene dichloride. The extract was washed with an aqueous 5% sodium bicarbonate solution and then with water, dried over anhydrous sodium sulfate, and then filtered through a column of silica gel to give a 43.6% yield (450 mg.) of estrone 3-n-amyl ether in the fractions eluted with 98% methylene dichloride-2% diethyl ether, melting point 82–83° C.; $[\alpha]_D$ +124°;

$\lambda_{max.}^{EtoH}$ 278–280; 287–8 m$\mu$ ($\epsilon$, 2,190; 1,950)

*Analysis.*—Calc'd for $C_{23}H_{32}O_2$: C, 81.13; H, 9.47; O, 9.40. Found: C, 81.03; H, 9.47; O, 9.61.

*Example VIII*

A mixture of 410 mg. of 19-nor-$\Delta^4$-pregnen-10$\beta$-ol-3,20-dione 10-acetate, 18 ml. of anhydrous methanol and 4 drops of an aqueous 70% perchloric acid solution was allowed to stand at room temperature overnight. Following this reaction period the reaction mixture was filtered to collect the resulting precipitate, and chromatography of this precipitate on silica gel with 95% methylene chloride-5% diethyl ether as the eluant gave a 61.5% yield (220 mg.) of 3-methoxy-19-nor-$\Delta^{1,3,5(10)}$-pregnatrien-20-one, melting point 133–134° C.; $[\alpha]_D$ +147°;

$\lambda_{max.}^{EtoH}$ 278, 286–7, m$\mu$ ($\epsilon$, 2,190; 1,950)

*Analysis.*—Calc'd. for $C_{21}H_{28}O_2$: C, 80.73; H, 9.03; O, 10.24. Found: C, 80.50; H, 9.09; O, 10.32.

By repeating this procedure in every detail but one, namely, replacing methanol with ethanol, a 55% yield (204 mg) of 3-ethoxy-19-nor-$\Delta^{1,3,5(10)}$-pregnatrien-20-one was produced, melting point 138–140° C.; $[\alpha]_D$ +159°;

$\lambda_{max.}^{EtoH}$ 280, 287 m$\mu$ ($\epsilon$, 2,190; 1,910)

*Analysis.*—Calc'd. for $C_{22}H_{30}O_2$: C, 80.93; H, 9.26; O, 9.8. Found: C, 80.93; H, 9.31; O, 9.93.

*Example IX*

To a solution of 1 gram of 19-nor-$\Delta^4$-pregnen-10$\beta$-ol-3,20-dione 10-acetate in 30 ml. of n-amyl alcohol there was added 1 ml. of an aqueous 70% perchloric acid solution, and the resulting reaction mixture was maintained at room temperature overnight. Following this reaction period the reaction mixture was filtered to collect the resulting precipitate, and chromatography of this precipitate on silica gel with 96% methylene chloride-4% diethyl ether as the eluant gave a 54.8% yield (565 mg.) of 3-n-amyloxy-19-nor-$\Delta^{1,3,5(10)}$-pregnatrien-20-one, melting point 117–119° C.; $[\alpha]_D$ +115°;

$\lambda_{max.}^{EtoH}$ 278, 287 m$\mu$ ($\epsilon$, 2,350; 2,090).

*Analysis.*—Calc'd. for $C_{25}H_{36}O_2$: C, 81.47; H, 9.85; O, 8.68. Found: C, 81.53; H, 9.74; O, 8.58.

By repeating the procedures given in Examples VIII and IX using 19-nor-$\Delta^4$-pregnene-10$\beta$,17$\alpha$-diol-3,20-dione 10-acetate and 19-nor-$\Delta^4$-pregnene-10$\beta$,17$\alpha$-diol-3,20-dione 10,17-diacetate as the steroid starting materials, the corresponding ring A aromatic 3-methyl, -ethyl and -n-amyl ethers, i.e., 3-methoxy-19-nor-$\Delta^{1,3,5(10)}$-pregnatrien-17$\alpha$-ol-20-one; 3-ethoxy-19-nor-$\Delta^{1,3,5(10)}$-pregnatrien-17$\alpha$-ol-20-one; 3-n-amyloxy-19-nor-$\Delta^{1,3,5(10)}$-pregnatrien-17$\alpha$-ol-20-one; 3-methoxy-19-nor-$\Delta^{1,3,5(10)}$-pregnatrien-17$\alpha$-ol-20-one 17-acetate; 3-ethoxy-19-nor-$\Delta^{1,3,5(10)}$-pregnatrien-17$\alpha$-ol-20-one 17-acetate and 3-n-amyloxy-19-nor-$\Delta^{1,3,5(10)}$-pregnatrien-17$\alpha$-ol-20-one 17-acetate, respectively, were obtained.

*Example X*

A solution of 100 grams of $\Delta^4$-estren-10$\beta$-ol-3,17-dione 10-acetate, 250 ml. of absolute ethanol, 50 ml. of ethyl orthoformate and 2 ml. of concentrated sulfuric acid was heated at 70° C., with stirring, under anhydrous conditions for 3.5 hours. Following this reaction period the reaction mixture was poured into 1 liter of an aqueous 5% sodium bicarbonate solution, then extracted with hexane containing 2% by volume of pyridine. The resultant extract was dried over anhydrous sodium sulfate and then evaporated to dryness under vacuum. Recrystallization from methanol containing 1% by volume of pyridine gave the 17-diethyl ketal of estrone 3-ethyl ether in almost quantitative yield.

By repeating this procedure in every detail but one, namely, replacing ethyl orthoformate with 2,2-dimethoxypropane, estrone 3-methyl ether was obtained.

*Example XI*

A solution of 2 grams of $\Delta^4$-estren-10$\beta$-ol-3,17-dione 10-acetate in 20 ml. of acetic anhydride, containing 100 mg. of p-toluenesulfonic anhydride, was heated at 60° C. for 3 hours. Following this reaction period the reaction mixture was poured into 300 ml. of ice water and stirred for 2 hours. The product obtained was extracted with methylene chloride and the extract was washed with water until neutral and then concentrated to dryness under reduced pressure. Crystallization of the residue from acetone/hexane gave $\Delta^{1,3,5(10)16}$-estratetraene-3,17-diol 3,17-diacetate.

A solution of 1 gram of the thus-obtained estratetraene diacetate in 50 cc. of methanol, containing 500 mg. of potassium hydroxide dissolved in 1 cc. of ice water, was refluxed for 3 hours. Following this reaction period the reaction mixture was poured into ice water and the resulting precipitate collected by filtration, washed with water, until neutral and then dried, thus giving a crude compound which, upon recrystallization from methylene chloride/diethyl ether, gave estrone.

This procedure was then repeated in every detail with these exceptions—$\Delta^4$-estrene-10$\beta$,17$\beta$-diol-3-one 10-acetate was used in place of $\Delta^4$-estren-10$\beta$-ol-3,17-dione 10-acetate as the steroid starting material, and acetic anhydride was replaced by isopropenyl acetate. A good yield of estradiol was obtained.

It will be obvious to those skilled in the art that other changes and variations can be made in carrying out the present invention without departing from the spirit and scope thereof as defined in the appended claims.

I claim:

1. 19-nor-$\Delta^4$-pregnene-10$\beta$,17$\alpha$-3,20-dione 10-acetate.

2. A process for the preparation of a $\Delta^{1,3,5(10)}$-steroid substituted at the 3-position with a member selected from the group consisting of a hydroxyl group, a lower alkoxy group and an acyloxy group containing less than 12 carbon atoms which comprises reacting a $10\beta$-lower acyloxy-19-nor-$\Delta^4$-3-keto steroid, wherein said lower acyloxy group contains from 2 to 7 carbon atoms, inclusive, in the presence of a catalytic amount of a proton donor.

3. A process for the preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in water in the presence of a catalytic amount of a proton donor.

4. A process for the preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in an inert organic solvent in the presence of a catalytic amount of a proton donor.

5. A process for the preparation of a $\Delta^{1,3,5(10)}$-steroid substituted at the 3-position with a lower alkoxy group which comprises reacting a $10\beta$-lower acyloxy-19-nor-$\Delta^4$-3-keto steroid, wherein said lower acyloxy group contains from 2 to 7 carbon atoms, inclusive, in a lower alkanol in the presence of a catalytic amount of a proton donor.

6. A process for the preparation of a $\Delta^{1,3,5(10)}$-steroid substituted at the 3-position with a lower alkoxy group which comprises reacting a $10\beta$-lower acyloxy-19-nor-$\Delta^4$-3-keto steroid, wherein said lower acyloxy group contains from 2 to 7 carbon atoms, inclusive, in a substance which, in acid medium, provides a lower alkanol in the presence of a catalytic amount of a proton donor.

7. A process for the preparation of a $\Delta^{1,3,5(10)}$-steroid substituted at the 3-position with a lower alkoxy group which comprises reacting a $10\beta$-lower acyloxy-19-nor-$\Delta^4$-3-keto steroid, wherein said lower acyloxy group contains from 2 to 7 carbon atoms, inclusive, in a lower alkyl orthoformate in the presence of a catalytic amount of a proton donor.

8. A process for the preparation of a $\Delta^{1,3,5(10)}$-steroid substituted at the 3-position with a lower alkoxy group which comprises reacting a $10\beta$-lower acyloxy-19-nor-$\Delta^4$-3-keto steroid, wherein said lower acyloxy group contains from 2 to 7 carbon atoms, inclusive, in a lower alkane containing at least three carbon atoms which is substituted on a non-terminal carbon atom thereof with two lower alkoxy groups in the presence of a catalytic amount of a proton donor.

9. A process for the preparation of a $\Delta^{1,3,5(10)}$-steroid substituted at the 3-position with an acyloxy group containing less than 12 carbon atoms which comprises reacting a $10\beta$-lower acyloxy-19-nor-$\Delta^4$-3-keto steroid, wherein said lower acyloxy group contains from 2 to 7 carbon atoms, inclusive, in an anhydride of an organic carboxylic acid containing less than 12 carbon atoms in the presence of a catalytic amount of a proton donor.

10. A process for the preparation of a $\Delta^{1,3,5(10)}$-steroid substituted at the 3-position with an acyloxy group containing less than 12 carbon atoms which comprises reacting a $10\beta$-lower acyloxy - 19 - nor-$\Delta^4$-3-keto steroid, wherein said lower acyloxy group contains from 2 to 7 carbon atoms, inclusive an enol ester of an organic carboxylic acid containing less than 12 carbon atoms with a lower alkanone in the presence of a catalytic amount of a proton donor.

11. A process for the preparation of estrone which comprises reacting $\Delta^4$-estren-$10\beta$-ol-3,17-dione 10-acetate in acetone in the presence of a catalytic amount of a proton donor.

12. A process for the preparation of $17\alpha$-ethynylestradiol which comprises reacting $17\alpha$-ethynyl-$\Delta^4$-estrene-$10\beta,17\beta$-diol-3-one 10-acetate in acetone in the presence of a catalytic amount of a proton donor.

13. A process for the preparation of 19-nor-$\Delta^{1,3,5(10)}$-pregnatrian-3-ol-20-one which comprises reacting 19-nor-$\Delta^4$-pregnen-$10\beta$-ol-3,20-dione 10-acetate in the presence of a catalytic amount of a proton donor.

14. A process for the preparation of estrone 3-methyl ether which comprises reacting $\Delta^4$-estren-$10\beta$-ol-3,17-dione 10-acetate in methanol in the presence of a catalytic amount of a proton donor.

15. A process for the preparation of the 17-diethyl ketal of estrone 3-ethyl ether which comprises reacting $\Delta^4$-estren-$10\beta$-ol-3,17-dione 10-acetate in ethyl orthoformate in the presence of the catalytic amount of a proton donor.

16. A process for the preparation of estrone 3-methyl ether which comprises reacting $\Delta^4$-estren-$10\beta$-ol-3,17-dione 10-acetate in 2,2-dimethoxypropane in the presence of a catalytic amount of a proton donor.

17. A process for the preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in the presence of at least about 1 molar equivalent, per molar equivalent of said $10\beta$-lower acyloxy steroid, of a strong base.

18. A process for preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in water in the presence of at least about 1 molar equivalent, per molar equivalent of said $10\beta$-lower acyloxy steroid, of a strong base.

19. A process for the preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in an inert organic solvent in the presence of at least about 1 molar equivalent per molar equivalent of said $10\beta$-lower acyloxy steroid of a strong base.

20. A process for the preparation of a $\Delta^{1,3,5(10)}$-steroid substituted at the 3-position with a hydroxyl group which comprises reacting a $10\beta$-lower acyloxy-19-nor-$\Delta^4$-3-keto steroid, wherein said lower acyloxy group contains from 2 to 7 carbon atoms, inclusive, in lower alkanol, in the presence of at least about 1 molar equivalent per molar equivalent of said $10\beta$-lower acyloxy steroid of a strong base.

21. A process for the preparation of estrone which comprises reacting $\Delta^4$-estren-$10\beta$-ol-3,17-dione 10-acetate in methanol in the presence of at least about 1 molar equivalent, per molar equivalent of said 10-acetate, of a strong base.

22. A process for the preparation of $17\alpha$-ethynylestradiol which comprises reacting $17\alpha$-ethynyl-$\Delta^4$-estren-$10\beta,17\beta$-diol-3-one 10-acetate in methanol in the presence of at least about 1 molar equivalent, per molar equivalent of said 10-acetate, of a strong base.

23. A process for the preparation of 19-nor-$\Delta^{1,3,5,(10)}$-pregnatrien-3-ol-20-one which comprises reacting 19-nor-$\Delta^4$-pregnen-$10\beta$-ol-3,20-dione 10-acetate in methanol in the presence of at least about 1 molar equivalent, per molar equivalent of said 10-acetate, of a strong base.

References Cited by the Examiner

UNITED STATES PATENTS

| | | | |
|---|---|---|---|
| 2,729,654 | 1/1956 | Colton | 260—397.4 |
| 3,086,028 | 4/1963 | Hecker | 260—397.3 |

LEWIS GOTTS, *Primary Examiner.*

HENRY A. FRENCH, *Assistant Examiner.*